Patented Jan. 7, 1930

1,742,472

UNITED STATES PATENT OFFICE

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO

PARASITICIDAL COMPOSITION

No Drawing. Application filed June 2, 1922. Serial No. 565,434.

This invention relates to improvements in parasiticidal compositions and has for its objects the addition to a water insoluble parasiticide, such as arsenate of lead, arsenate of calcium, arsenate of zinc, Paris green, powdered sulfur, Bordeaux mixture, and others which are usually applied either as a dry dusting spray or suspended in water as a liquid spray, of a comparatively cheap natural mineral substance for improving the spreading or distribution and the final adhesion of the parasiticide.

I have found that the natural mineral emulsoids are well suited for this purpose and by natural mineral emulsoids I mean the mineral substances variously known as Bentonite, Wilkinite and other related minerals. I have also found that those parasiticides which have a greasy water-repellant nature, when suspended in water, lose this water-repellant nature to a considerable degree or altogether, when a natural mineral emulsoid is mixed with them and, therefore, by the addition of this material to such parasiticides it is possible to prepare a liquid spray of a more homogeneous composition.

I have also found that those parasiticides which, on account of their high gravity or other peculiar physical condition, have a tendency to settle out from their water suspensions to a hard or tough and not easily suspensible paste, have this undesirable tendency greatly lessened or entirely removed when a natural mineral emulsoid is added.

In practicing my invention it is first necessary to reduce the natural mineral emulsoid to a very fine state of division and, to accomplish this, any of the usual types of pulverizing mills may be used, the primary requisite being to reduce the material to a finely divided state. The mineral emulsoid is next mixed with the parasiticide which should also be in the form of a dry powder. This mixing may be accomplished in any of the ordinary types of mixing apparatus but most excellent results may be obtained in a ball or pebble mill which not only mixes but also further pulverizes any stray, coarse particles or lumps which may have escaped the previous milling operation.

The ratio of mineral emulsoid to parasiticide may be varied according to the nature of the parasiticide, a heavy gravity product, like Paris green or arsenate of lead, may best be mixed with from one to ten percent of the mineral emulsoid, while a lighter gravity product of greater water-repelling properties, such as sulfur, may best be mixed with from twenty to thirty percent of the mineral emulsoid. Larger percentages of the mineral emulsoid may be used but it must be borne in mind that, since there is little or no toxicity in the mineral emulsoid alone, it is usually advisable to use no more of the latter than is needed to give the desired result.

By the term parasiticide I intend to cover all substances which are used either as fungicides, or insecticides, or both.

Having thus described my invention, what I claim is:

1. A parasiticidal composition the major part of which is pulverized sulfur and the minor part Bentonite.

2. A parasiticidal composition composed of a pulverized parasiticidal material having a water-repellent nature and pulverized Bentonite.

3. An insecticidal composition comprising sulfur and Wilkinite.

In testimony whereof I affix my signature.

EDWARD C. HOLTON.